(12) United States Patent
Murga et al.

(10) Patent No.: US 10,639,873 B1
(45) Date of Patent: May 5, 2020

(54) HEAT SEALING POLYESTER FILMS WITH LOW COEFFICIENT OF FRICTION

(71) Applicant: Toray Plastics (America), Inc., North Kingstown, RI (US)

(72) Inventors: Gerardo Eugenio Rada Murga, Warwick, RI (US); Jan Moritz, Bristol, RI (US); Kari Shoolbraid, Pawtucket, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 138 days.

(21) Appl. No.: 15/924,180

(22) Filed: Mar. 17, 2018

Related U.S. Application Data

(60) Provisional application No. 62/537,065, filed on Jul. 26, 2017.

(51) Int. Cl.
*B32B 27/36* (2006.01)
*B32B 27/08* (2006.01)
(Continued)

(52) U.S. Cl.
CPC .......... *B32B 27/36* (2013.01); *B29C 48/0018* (2019.02); *B32B 27/08* (2013.01); *B32B 27/20* (2013.01); *B29C 48/08* (2019.02); *B29C 48/21* (2019.02); *B29C 55/12* (2013.01); *B29K 2067/003* (2013.01); *B29K 2067/006* (2013.01); *B29K 2105/0008* (2013.01); *B29K 2995/0017* (2013.01); *B29K 2995/0053* (2013.01); *B32B 7/04* (2013.01); *B32B 7/12* (2013.01); *B32B 27/18* (2013.01); *B32B 2250/02* (2013.01); *B32B 2250/24* (2013.01); *B32B 2250/244* (2013.01); *B32B 2307/31* (2013.01); *B32B 2307/702* (2013.01); *B32B 2307/704* (2013.01); *B32B 2307/746* (2013.01); *B32B 2367/00* (2013.01); *C08K 3/013* (2018.01); *C08K 3/36* (2013.01); *C08L 67/00* (2013.01); *C08L 67/02* (2013.01); *C08L 67/03* (2013.01); *C08L 2205/02* (2013.01); *C09D 167/00* (2013.01); *C09D 167/02* (2013.01); *C09D 167/03* (2013.01); *Y10T 428/265* (2015.01);
(Continued)

(58) Field of Classification Search
None
See application file for complete search history.

(56) References Cited

U.S. PATENT DOCUMENTS 3,953,394 A * 4/1976 Fox .................... C08L 67/02
524/86
4,041,206 A * 8/1977 Tsunashima ............ B32B 27/36
428/409

(Continued)

FOREIGN PATENT DOCUMENTS

JP 2010-228178 A * 10/2010

*Primary Examiner* — Vivian Chen
(74) *Attorney, Agent, or Firm* — Rogowski Law LLC

(57) ABSTRACT

Coextruded biaxially oriented sealable polyester films having at least one heat-sealable layer and at least one base layer. The heat-sealable layer has a sealing temperature on APET or PETG trays of at least 250° F. (121° C.) for seal strength of at least 1,500 g/in of film width, and a static and dynamic coefficient of friction of 0.28 or less. The heat-sealable layer includes one or more amorphous polyesters and one low melting point crystallizable polyester, such as polybutylene terephthalate (PBT).

8 Claims, 1 Drawing Sheet

(51) Int. Cl.
   *B32B 27/20*   (2006.01)
   *B32B 7/12*    (2006.01)
   *B32B 27/18*   (2006.01)
   *B32B 7/04*    (2019.01)
   *C08L 67/03*   (2006.01)
   *C09D 167/02*  (2006.01)
   *C09D 167/03*  (2006.01)
   *C09D 167/00*  (2006.01)
   *C08L 67/02*   (2006.01)
   *C08K 3/013*   (2018.01)
   *C08L 67/00*   (2006.01)
   *C08K 3/36*    (2006.01)
   *B29C 48/00*   (2019.01)
   *B29C 55/12*   (2006.01)
   *B29K 67/00*   (2006.01)
   *B29K 105/00*  (2006.01)
   *B29C 48/08*   (2019.01)
   *B29C 48/21*   (2019.01)

(52) U.S. Cl.
   CPC ...... *Y10T 428/268* (2015.01); *Y10T 428/2813* (2015.01); *Y10T 428/2817* (2015.01); *Y10T 428/2826* (2015.01); *Y10T 428/31786* (2015.04)

(56) References Cited

U.S. PATENT DOCUMENTS

| | | | | |
|---|---|---|---|---|
| 4,375,494 A * | 3/1983 | Stokes | ............ | B32B 27/08 428/323 |
| 4,704,417 A * | 11/1987 | Bonin | ............ | C08K 5/521 524/140 |
| 5,204,181 A * | 4/1993 | Suzuki | ............ | B32B 15/08 428/349 |
| 5,747,174 A * | 5/1998 | Kimura | ............ | B29C 55/023 428/480 |
| 6,165,610 A * | 12/2000 | Moore | ............ | C08L 67/02 428/344 |
| 8,658,285 B2 | 2/2014 | Hinton | | |
| 8,932,725 B2 | 1/2015 | Koehn | | |
| 8,932,726 B2 | 1/2015 | Koehn | | |
| 9,109,138 B2 | 8/2015 | Paolilli | | |
| 9,221,286 B2 | 12/2015 | Bower | | |
| 9,339,318 B2 | 7/2016 | Paolilli | | |
| 9,399,318 B2 * | 7/2016 | Paolilli | ............ | C08J 5/18 |
| 9,630,385 B2 | 4/2017 | Moritz | | |
| 9,669,591 B2 | 6/2017 | Koehn | | |
| 9,676,122 B2 | 6/2017 | Bower | | |
| 2002/0071922 A1 * | 6/2002 | Bailey | ............ | B32B 7/10 428/35.3 |
| 2002/0150751 A1 * | 10/2002 | Murschall | ............ | G09F 7/00 428/331 |
| 2002/0186120 A1 * | 12/2002 | Tamura | ............ | C08G 63/183 338/22 R |
| 2002/0187328 A1 * | 12/2002 | Murschall | ............ | C08J 5/18 428/220 |
| 2003/0054169 A1 * | 3/2003 | Murschall | ............ | B32B 27/18 428/395 |
| 2003/0099846 A1 * | 5/2003 | Murschall | ............ | B32B 27/36 428/458 |
| 2003/0215587 A1 * | 11/2003 | Fatica | ............ | B32B 27/32 428/34.2 |
| 2005/0042441 A1 * | 2/2005 | Peiffer | ............ | B32B 27/36 428/336 |
| 2005/0074599 A1 * | 4/2005 | Peiffer | ............ | B29C 55/023 428/323 |
| 2005/0100718 A1 * | 5/2005 | Peiffer | ............ | B32B 27/36 428/200 |
| 2005/0100729 A1 * | 5/2005 | Peiffer | ............ | B32B 27/36 428/323 |
| 2005/0118442 A1 * | 6/2005 | Itoh | ............ | B32B 15/08 428/480 |
| 2005/0121822 A1 * | 6/2005 | Peiffer | ............ | B32B 27/36 264/173.16 |
| 2005/0173050 A1 * | 8/2005 | Peiffer | ............ | B32B 27/36 156/244.11 |
| 2006/0008638 A1 * | 1/2006 | Kiehne | ............ | B29C 55/023 428/323 |
| 2006/0172131 A1 * | 8/2006 | Haedt | ............ | B32B 7/06 428/336 |
| 2006/0257646 A1 * | 11/2006 | Fatica | ............ | B32B 7/02 428/323 |
| 2006/0275601 A1 * | 12/2006 | Suzuki | ............ | B29C 55/023 428/339 |
| 2008/0063857 A1 * | 3/2008 | Konrad | ............ | B32B 27/36 428/323 |
| 2008/0260917 A1 * | 10/2008 | Sankey | ............ | B32B 3/10 426/114 |
| 2011/0220645 A1 * | 9/2011 | Niederst | ............ | B32B 15/08 220/200 |
| 2012/0152954 A1 * | 6/2012 | Bruehl | ............ | B65D 77/2052 220/265 |
| 2013/0011631 A1 * | 1/2013 | Sakellarides | ............ | B32B 27/06 428/195.1 |
| 2013/0344345 A1 * | 12/2013 | Sakellarides | ............ | B32B 27/18 428/458 |
| 2014/0065431 A1 * | 3/2014 | Sakellarides | ............ | B32B 27/36 428/446 |
| 2014/0329015 A1 * | 11/2014 | Montcrieff | ............ | B32B 27/08 427/322 |
| 2018/0079577 A1 * | 3/2018 | Gruetzmacher | ............ | B32B 1/00 |

\* cited by examiner

HEAT SEALING POLYESTER FILMS WITH LOW COEFFICIENT OF FRICTION

CROSS-REFERENCE TO RELATED APPLICATION

This application claims priority under 35 USC § 119(e) to U.S. Provisional Application Ser. No. 62/537,065, entitled "Heat Sealing Polyester Films With Low Coefficient of Friction", filed Jul. 26, 2017, the disclosure of which is incorporated by reference herein.

FIELD OF THE INVENTION

What is disclosed are coextruded biaxially oriented sealable polyester films comprising at least one heat-sealable layer (A) and at least one base layer (B), wherein the heat-sealable layer (A) has a sealing temperature on amorphous polyethylene terephthalate (APET) or polyethylene terephtalate glycol-modified (PETG) trays or blister packs of at least 250° F. (121° C.) and a seal strength of at least 1,500 g/in of film width (8.7 N/15 mm), and wherein the layer (A) has a static and a dynamic coefficient of friction of 0.28 or less.

BACKGROUND OF THE INVENTION

Coextruded films with one side heat-sealable serve a growing market as lidding films for thermoformed trays and blister packs used in packaging. A common thermoforming material for such trays, in particular blister pack trays, is amorphous polyester sheet (APET or PETG). The term APET refers to PET (polyethylene terephthalate) sheet that has been extruded and quenched on a cooling drum or a water bath before it has time to crystallize and thus maintains its transparency. Transparency is further maintained during the thermoforming step, which is conducted at a reheat temperature above PET's glass transition temperature (around 80° C.), which is high enough to soften the material but not so high that it would lead to chain rearrangement resulting in formation of crystal domains which produce internal haze. The term PETG refers to an amorphous (non-crystallizable) PET copolyester modified with a glycol (1,4-cyclohexyldimethanol).

A sealable lidding film can be used to cover such trays. A PET-based lidding film is an extruded biaxially oriented PET, which, unlike the underlying APET container, has been subjected after the extrusion step (which is similar to the extrusion step used to produce the APET sheet) to an additional treatment consisting of rapid stretching at elevated temperatures along the machine direction, followed by stretching along the transverse direction, with heat-setting steps after each stretching or orientation step. This rapid stretching is effective in introducing crystallinity without compromising film clarity.

One important physical property for lidding films used in blister packs is easy slipping as an aid for film handling and machinability during winding, unwinding, and moving through various sections of the package forming and handling processing, typically characterized by coefficient of friction (COF). Typical coefficient of friction for polyester films is 0.4-0.5, which can be modified or controlled to some extent by manipulating the surface roughness of the film's surface. One method is by adding inorganic particles (i.e. anti-blocking additives) in the film-making process. Another method may be by adding low molecular weight lubricants (slip additives) such as low or high viscosity silicone oils, fatty amides, waxes, or combinations thereof. Such methods to control COF are not limited by these examples, however.

In more detail, unmodified film (i.e., film with high or uncontrolled COF) can be easily scratched during handling, can be prone to wrinkling and web breaks during winding, slitting, and other handling, and thus can be limited in terms of processing speed, material efficiency, and productivity. Adding inorganic or crosslinked particles into the film makes a rougher surface, which results in a lower friction coefficient. An additional requirement once a package is formed, is easy stick-free movement through the packaging and dispensing process, such as vending machines.

When coefficients of friction lower than those typically accomplished by particles are desired (e.g., COF of 0.3-0.4), the conventional solution is the use of slip agents, typically coatings or additives such as waxes or silicones. However, a disadvantage of coatings is wear debris or build-up on machinery surfaces as the packages move through automated packaging equipment, which accumulate over time, causing stoppages and/or requiring cleaning. Another disadvantage is that when coatings are applied to a heat-sealable surface, they are usually detrimental to the heat-sealing characteristics.

Alternatively, one could envision increasing the loading of inorganic particles above the typical addition level; this, however, can result in a loss of heat-sealing performance as well.

A need exists therefore for lidding films having a heat-sealable surface with slip characteristics, which maintain their heat-sealability after being modified for low coefficient of friction.

SUMMARY OF THE INVENTION

In one aspect, the invention provides a solution to the need for a polyester-based lidding film with a heat-sealable surface, having low coefficient of friction. One embodiment is a film comprising a heat-sealable layer coextruded on one side of a main (or base or core) layer, followed by biaxial stretching of the coextruded film. The inventive heat-sealable layer comprises one or more amorphous polyesters and one low melting point crystallizable polyester: one such low melting point crystallizable polyester is polybutylene terephthalate (PBT) added at a weight concentration between 10-40 wt. %, preferably 25 wt. %, of the heat-sealable layer. The remaining ingredient (amorphous polyester) is a random copolymer of polyethylene isophthalate/polyethylene terephthalate (i.e., derived from a diacid mix of isophthalic acid and terephthalic acid reacted with ethylene glycol—also known as "IPET"—with polyethylene isophthalate content in the range 15-20 wt %, preferably around 19 wt % of the copolymer. Another suitable amorphous polyester is a copolymer derived from terephthalic acid with a diol mix of ethylene glycol and 1,4-cyclohexyldimethanol at a molar combination ratio about 68:32 (also known as "PETG").

Another embodiment of the invention is a polyester film comprising a heat-sealable layer as described above with the addition of inorganic particles such as silica. The silica particles are added as a masterbatch to the heat-sealable layer from which the overall coextruded film is formed.

In both cases, the base layer consists essentially and preferably of a polyethylene terephthalate (PET) or other biaxially stretched film-forming crystallizable polyester such as polyethylene naphthalate, polybutylene terephthalate (PBT), polycyclohexyldimethylterephthalate (PCT), etc. The base film also may contain mineral fillers for easy handling. It also can be contemplated to add other additives as desired to the base layer (such as UV-blocking or UV-absorbing additives, flame retardant additives, etc.) without affecting the novel characteristics of the low COF heat-sealable film invention.

The inventive film has static coefficient of friction between its two sides (i.e. surface side of layer (A) against surface side of layer (B) (also known as "A/B" COF) in the range of 0.20-0.28 and dynamic coefficient of friction in the range of 0.14-0.25, and a maximum heat-seal strength of the heat-sealable layer (A) on APET or PETG substrates or containers of at least 1,500 g/in at a seal temperature of 250° F. The inventive film's thickness can vary between 48-200 G (ca. 12-50 μm), preferably (for lidding film intended for blister packs) 120 G (ca. 30 μm).

BRIEF DESCRIPTION OF THE DRAWINGS

The foregoing summary, as well as the following detailed description of the invention, will be better understood when read in conjunction with the appended drawings. For the purposes of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
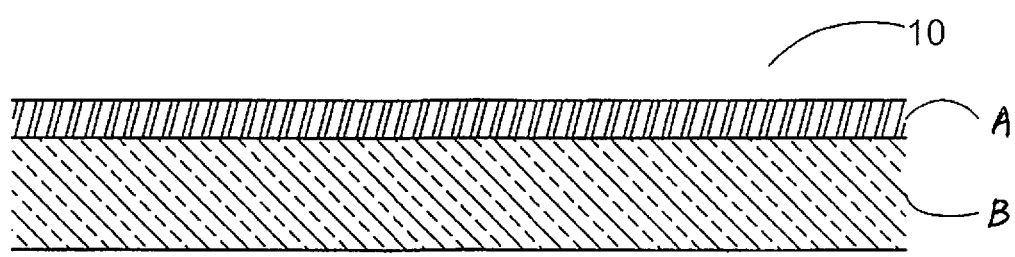
FIG. 1 is an elevation section view of an embodiment of this invention of a multilayer polyester film with a heat-sealable layer positioned on a base layer.

Referring to FIG. 1, the invention relates to coextruded biaxially oriented sealable polyester film 10 comprising at least one heat-sealable layer (A) and at least one base layer (B), where the seal layer (A) has a sealing temperature on APET trays or blister packs of at least 250° F. (121° C.) for a maximum seal strength of at least 1,500 g/in of film width (8.7 N/15 mm), a static coefficient of friction of around 0.20 and a dynamic coefficient of friction of around 0.15. The film comprises at least two coextruded layers, a heat-sealable skin layer (A) and a substantially non-heat-sealable main layer (B).

Main Layer

The main layer (B) comprises one or more biaxially stretched film-forming crystallizable polyester such as polyetheylene terephthalate, polyethylene naphthalate, polybutylene terephthalate, polycyclohexyldimethylterephthalate (PCT), etc. The base film may also contain mineral, other inorganic, crosslinked polymers or other organic materials—or combinations thereof—fillers for easy handling.

Typical polyester resins used in the base layer (B) can include, but are not limited to: homopolyesters or copolyesters of polyethylene terephthalate (PET), polyethylene naphthalate (PEN), polyethylene terephthalate-co-isophthalate copolymer (IPET), polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, and combinations thereof. In preferable embodiments, the polyester comprises poly(ethylene terephthalate) repeat units. The polyester in the base layer can comprise about 70-99.9 wt %.

The term "crystalline polyester" can refer to a polyester that has developed at least partial crystallinity during the orientation and heat-setting steps of the film-making process. Without being bound by any theory, crystallinity can involve a regular repeating arrangement of the molecules. To produce a crystal, the polymer chains can be capable of packing closely together in a regular, parallel array. The formation of crystals can require polymer chain mobility. Once a certain degree of crystallinity is attained (which depends on the temperature at which crystallization is taking place) further mobility can be restricted such that a fraction of the polymer remains in a non-crystalline state ("amorphous"). Thus, the term "degree of crystallinity" can reflect the relative amount of crystalline regions and amorphous regions.

The crystalline polyester layer (B) can be comprised of a high crystalline polyester. The high crystalline polyester layer can include high intrinsic viscosity (IV) homopolyesters such as PET, PBT, or PEN, or copolymers or blends thereof. In some embodiments, the crystalline polyester layer can include a polyester resin with an intrinsic viscosity greater than about 0.4 dl/g, about 0.45 dl/g, about 0.5 dl/g, about 0.55 dl/g, about 0.6 dl/g, or about 0.65 dl/g.

In some embodiments, the crystalline polyester layer (B) comprises polyethylene terephthalate. In some embodiments, the crystalline polyester layer can comprise a polyester resin with an intrinsic viscosity ranging between about 0.45-0.95 dl/g, about 0.5-0.9 dl/g, about 0.55-0.9 dl/g, or about 0.6-0.85 dl/g. In some embodiments, the crystalline polyester layer can comprise a polyester resin with a melting point of about 245-270° C., about 250-265° C., or about 255-260° C. In some embodiments, the crystalline polyester layer can comprise a polyester resin with a heat of fusion of about 20-60 J/g, about 25-55 J/g, or about 30-46 J/g. In some embodiments, the crystalline polyester layer can comprise a polyester resin with a density of about 1-2 $g/cm^3$, about 1.2-1.6 $g/cm^3$, about 1.3-1.5 $g/cm^3$, or about 1.4 $g/cm^3$.

The crystalline polyester layer (B) can further include other additives such as antiblock and/or slip additives. The additives can typically be solid particles dispersed within the layer effectively to produce a lower coefficient of friction on the exposed surface of the layer. This desired coefficient of friction can help the film to move smoothly through the film formation, stretching, and/or wind-up operations. Without such antiblocking and/or slip additives, the outer surface can be more tacky and can cause the film being fabricated to stick to itself and to processing equipment causing excessive production waste and low productivity.

The antiblock and/or slip additives can be added to the base layer (B) of the coextruded film, and/or additionally, to the skin layer (A) (or other additional skin layers) of the film in an amount of about 0.01-1.0 wt %, preferably about 0.03-0.8 wt %, or more preferably, about 0.1-0.4 wt % of the particular layer. Examples of antiblock and/or slip additives that may be used for polyester film applications can include amorphous silica particles with mean particle size diameters in the range of about 0.05-0.1 μm at concentrations of preferably 0.1-0.4 wt % the film or layer; calcium carbonate particles with a medium particle size of 0.3-1.2 μm at concentrations of preferably 0.03-0.2 wt % the film or layer; and precipitated alumina particles of sub-micron sizes with an average particle size of about 0.1 μm at concentrations of preferably 0.1-0.4 wt % of the film or layer. Additional examples include (but are not limited to) inorganic particles, aluminum oxide, magnesium oxide, titanium oxide, such complex oxides as kaolin, talc, and montmorillonite, such carbonates as calcium carbonate and barium carbonate, such sulfates as calcium sulfate and barium sulfate, such titanates as barium titanate and potassium titanate, and such phosphates as tribasic calcium phosphate, dibasic calcium phosphate, and monobasic calcium phosphate, or combinations thereof. Two or more of these may be used together to achieve a specific objective. While not intending to be limiting, examples of organic particles that may be used or contemplated in the base film or other layers of the film include: vinyl materials such as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene. Combinations of these organic particles with inorganic particles can also be contemplated.

One way to incorporate the aforementioned antiblock particles can be via masterbatch addition. In one embodiment, a high crystalline polyester layer can be produced by extruding a pellet-to-pellet mixture of unfilled crystalline polyester pellet and masterbatch polyester pellet (additive concentrate).

Heat-Sealable Layer

In some embodiments, the amorphous polyester skin layer (A) can comprise 60-90 wt. % of one or more of the following: isophthalate modified copolyesters, sebacic acid modified copolyesters, diethyleneglycol modified copolyesters, triethyleneglycol modified copolyesters, and/or cyclohexanedimethanol modified copolyesters. In some embodiments, copolyesters in the amorphous polyester skin layer have a low melting or amorphous aromatic copolyester (such as one based on terephthalate/isophthalate copolymer with ethylene glycol or a copolyester made from a combination of terephthalic acid, ethylene glycol, and cyclohexyldimethanol). The amorphous copolyester may comprise isophthalate modified copolyesters, sebacic acid modified copolyesters, diethyleneglycol modified copolyesters, triethyleneglycol modified copolyesters, cyclohexanedimethanol modified copolyesters, and combinations thereof. In some embodiments, the amorphous polyester skin layer can comprise a copolymer with about 15-20 wt % isophthalate and about 80-85 wt % terephthalate polyester repeat units with ethylene glycol.

The term "amorphous layer" refers to lack of crystallinity development during biaxial stretching, as a result of the copolyesters present having very slow crystallization rate or being not capable of crystallization. The advantage of that feature is heat-sealability to a substrate at temperatures wherein the main or base layer stays intact. In one embodiment, the heat-sealable skin layer (A) comprises between 40-10 wt. % of a crystallizable resin, PBT (polybutylene terephthalate), preferably 25 wt %. It was surprisingly found that incorporation of that resin reduces coefficient of friction. The reason for that effect has not been established; however, without being bound by any theory, one possible theory is that PBT (which is a resin with high crystallization rate) creates crystalline microdomains, which, due to differential hardness, effectively constitute "bumps" upon the layer's exposed surface that reduce COF. Alternatively, it can be envisioned that the microcrystalline domains reduce the "stickiness" inherent with a completely amorphous surface, thus reducing COF.

In another embodiment, the PBT resin is combined with inorganic particles, such as amorphous silica. Other inorganic particles can be envisioned as well, such as described in detail above in respect of the main layer. It was found that a combination of PBT and (optionally) silica preserves the heat-seal initiation (i.e., the minimum temperature setting of a heat-sealing machine to achieve at least 1000 g/in seal strength) in the 250-275° F. (121-135° C.) range and widens the processing window for heat-sealing equipment. On the other hand, the same level of silica without the PBT, while producing acceptable COF, results in lower heat-seal values or properties; and/or a narrower processing window.

Figure 2:
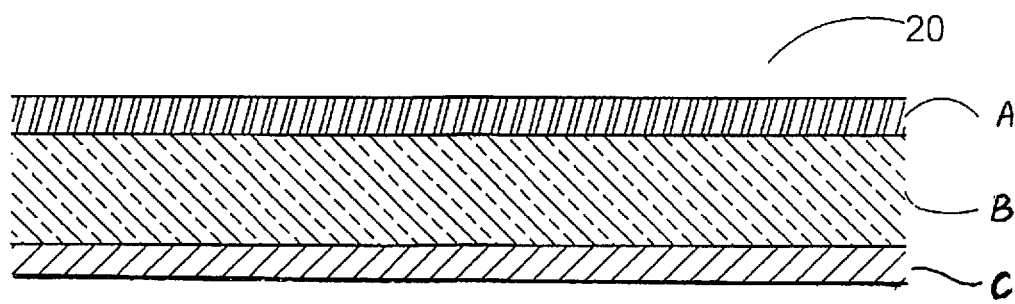
FIG. 2 is an elevation section view of an embodiment of this invention of a multilayer polyester film with a heat-sealable layer positioned on one face of a base layer, and another layer on the opposite face of the base layer.

As shown in FIG. 2, the film 20 may include other layers (C) positioned on the side of the main layer (B) opposite the coextruded heat-seal layer (A) for improving various performance aspects such as gas barrier, appearance, hardness, print (ink) adhesion, for example, a receiving layer suitable for metal deposition, ceramic deposition, in-line or off-line coatings comprising organic barrier layers, etc. Such a layer (C) is preferably coextruded with the main or base layer (B).

General Film Making Procedure

Multi-layer coextruded biaxially oriented (BO) PET film was made using a 1.5 m-wide pilot-line sequential orientation process. The coextruded film was cast onto a chill drum using an electrostatic pinner, oriented in the machine direction through a series of heated and differentially sped rolls, followed by transverse direction stretching in a tenter oven.

The multi-layer coextruded laminate sheet is coextruded by means of a main extruder for melting and conveying the core layer (B)'s resin blend to the die and by means of one or two sub-extruders for melting and conveying the skin layer's (e.g., layer (A) and/or layer (C)) blends to the die. Extrusion through the main extruder takes place at processing temperatures of ca. 275° to 285° C. Extrusion through the sub-extruder takes place at processing temperatures of ca. 250° C. Both the main and the sub-extruders' polymer melt streams flow through a die to form the laminate coextruded structure and is cast onto a cooling drum whose surface temperature is controlled at about 15° C. in order to solidify the non-oriented laminate sheet at a casting speed of about 8.4 m/min. The non-oriented laminate sheet is stretched in the longitudinal direction at about 80° C. to 85° C. at a stretching ratio of about 3 times the original length and the resulting stretched sheet is annealed or heat-set at about 70° C. to obtain a uniaxially oriented laminate sheet.

The uniaxially oriented laminate sheet is then introduced into a tenter oven at a line speed of ca. 25 m/min and preliminarily heated to 80° C., and stretched in the transverse direction at about 100° C. at a stretching ratio of about 4.5 times the original width and then heat-set or annealed at about 195° C. to reduce internal stresses due to the orientation and minimize shrinkage and give a relatively thermally stable biaxially oriented sheet. The biaxially oriented laminate sheet has an overall thickness between 36-300 G, preferably 60-200 G, more preferably 120 G. Skin thickness (layer A) can be between 0.5-5 μm, preferably 1-3 μm, more preferably 1.5-2 μm.

Raw Materials

Film-Grade crystalline polyethylene terephthalate (PET) resin: F21MP (IV=0.65; Tm=255° C.) manufactured by Toray Plastics (America), Inc.

PET resin anti-block masterbatch F18M, containing 2 wt % silica particles of average size 2 μm (Fuji Silysia 310P) dispersed in a PET resin matrix, manufactured by Toray Plastics (America), Inc. (IV=0.62; Tm=255° C.).

Slow-crystallizing copolyester Resin "IPET", F55M Resin (IV=0.69; Tm=205° C.) manufactured by Toray Plastics (America), Inc. based on 19:81 molar (=weight % in this case) parts combination of isophthalic/terephthalic acid reacted with ethylene glycol.

PET resin silica masterbatch for low COF: T89SY5, containing 10 wt % silica particles of average size 2 μm (Fuji Silysia 310P silica) dispersed in an IPET resin, manufactured by Toray Industries.

PET resin silica masterbatch for low COF: F55YS, containing 10 wt % silica particles of average size 2 μm (Fuji Silysia 310P silica) dispersed in an IPET resin, manufactured by Toray Industries.

Polybutylene terephthalate (PBT) resin Toraycon™ 1200M manufactured by Toray Industries, having melting point 223° C.

Wax masterbatch: W030, containing 2 wt. % carnauba wax, manufactured by Toray Industries.

Test Methods

The various properties in the examples were measured by the following methods:

(1) Intrinsic viscosity (IV) of the film and resin were tested according to ASTM D 4603. This test method is for the IV (intrinsic viscosity) determination of poly(ethylene terephthalate) (PET) soluble at 0.50% concentration in a 60/40 ratio of phenol/1,1,2,2-tetrachloroethane solution by means of a glass capillary viscometer.

(2) Resin melting point is measured using a TA Instruments Differential Scanning calorimeter model 2920. A ca. 0.007 g resin sample is tested, substantially in accordance to ASTM D3418-03. The preliminary thermal cycle is not used, consistent with Note 6 of the ASTM Standard. The sample is then heated up to 300° C. temperature at a rate of 10° C./minute, while heat flow and temperature data are recorded. The melting point is reported as the temperature at the endothermic peak.

(3) Heat-Seal Strength was measured by heat sealing on a SENTINEL™ Sealer model 12 ASL at temperatures between 200° F. and 425° F. (25° F. intervals), 0.5 second dwell, and 30 psi seal jaw pressure. The test specimen consisted of a 1" wide piece of lidding film and a 1" wide piece of APET sheet. Sealing was done between that surface and the heat-sealable layer surface of the film. Peel strength was measured at 180° angle using an Instron 3343 tester at a rate of 12 in/min. The tester calculates the maximum seal strength and the average of the zig-zag pattern during the steady state section of the peel (horizontal average) without taking into account the original stress inception or the final stress decay section when the film reaches the end of the sealed portion. The test is repeated three times and the number provided in the examples is the average of the maximum seal strengths. The following patents by Mitsubishi Polyester Films, all of which are incorporated by reference in their entirety, contain a schematic explaining the E-Z Peel test:

U.S. Pat. No. 7,141,293 (FIG. 2)
U.S. Pat. No. 7,442,427 (FIG. 2)
U.S. Pat. No. 7,329,453 (FIG. 2)
U.S. Pat. No. 7,205,040 (FIG. 2)

The preferred range in the embodiments is a maximum seal strength of at least 1,500 g/in and as high as 2000 g/in or more at a seal temperature of 250° F. on APET substrate, consisting of cast unoriented PET film precursor ("A film") corresponding to Toray Plastics (America), Inc. film type Lumirror F65C, collected right after the cooling drum and before the machine direction orientation (MDO) step.

In addition, seal initiation temperature can be obtained in the same manner as obtaining heat seal strength above. In this case, the sealing temperature of the SENTINELT™ sealer is lowered until a seal strength of ca. 1000 g/in is obtained. This sealing temperature at which 1000 g/in seal strength is defined as the "seal initiation temperature" of the test film.

(4) Coefficient of Friction: The coefficient of friction (symbol: μ) can be either the coefficient of static friction or the coefficient of dynamic friction, based on the formula $F_f=\mu F_n$, where the coefficient of static friction, $\mu_s$ is the friction force between two objects when neither of the objects is moving. The coefficient of dynamic friction is the force between two objects when one object is moving, or if two objects are moving against each other. The values of the coefficient of static ($\mu_s$) and dynamic friction ($\mu_d$) were measured using a calibrated friction meter Monitor/Slip & Friction Model No. 32-06 made by Testing Machines Inc. (TMI) substantially in conformance to ASTM D 1894. The friction testing was conducted in the "ND/D" mode, i.e. between one film side ("drum side") and the opposite film side ("non-drum side"), where drum refers to the extrusion casting drum (cooling drum). The COF was essentially measured between the outer surface of the heat-sealable side (A) and the side of the base layer (B) opposite the heat-sealable side (A). (This can also be known as measuring "A/B" COF.) The preferred range in the embodiments is 0.10-0.28 (less than 0.29) for both static and dynamic COF.

EXAMPLES

This invention will be better understood with reference to the following examples, which are intended to illustrate specific embodiments within the overall scope of the invention.

Comparative Example 1

A two-layer coextruded BOPET film structure with 100 wt % IPET skin (layer A) was produced by melt extrusion through two extruders supplying the resin blends corresponding to layers A and B as shown on Tables 1 and 2, respectively, through a film die. The co-extruded two-layer molten web was cast on a set of two cooling drums. Layer A was cast on the drum side ("D") and layer B on the non-drum side ("ND"). The cast film was formed into a 120 G (30 μm) biaxially oriented film, having nominal skin (layer A) thickness 2 μm and nominal core layer thickness (layer B) 28 μm.

Comparative Example 2

This comparative example is represented by a commercially available heat-sealable film Lumirror™ PA25 from Toray Plastics (America), Inc. having similar skin and core layer composition to Comp. Ex. 1. This film is a nominal 120 G (30 μm) biaxially oriented film, having nominal skin (layer A) thickness 2 μm and nominal core layer thickness (layer B) 28 μm.

Comparative Example 3

This comparative example is represented by a commercial heat-sealable film Lumirror™ PA45 from Toray Plastics (America), Inc. having similar skin and core layer composition to Comp. Ex. 1. This film is a nominal 120 G (30 μm) biaxially oriented film, having nominal skin (layer A) thickness 3 μm and nominal core layer thickness (layer B) 27 μm.

Comparative Example 4

Comp. Example 1 was repeated with the difference that the skin layer (A) formulation contained 4 wt. % IPET-based silica masterbatch (Toray Industries T89SY5), i.e., 0.40 wt. % silica particles.

Comparative Example 5

Comp. Example 1 was repeated with the difference that the skin layer (A) formulation contained 8 wt. % IPET-based silica masterbatch (Toray Industries T89SY5), i.e., 0.80 wt. % silica particles.

Comparative Example 6

Comp. Example 1 was repeated with the difference that the skin layer (A) formulation contained 5 wt. % wax masterbatch (Toray Industries W030), i.e., 0.1 wt. % carnauba wax.

Comparative Example 7

Comp. Example 1 was repeated with the difference that the skin layer (A) formulation contained 4 wt. % IPET-based silica masterbatch (Toray Industries F55YS), i.e. 0.4 wt. % silica particles and 5 wt. % wax masterbatch (Toray Industries W030), i.e. 0.1 wt. % carnauba wax.

Example 1

Comp. Example 1 was repeated with the difference that the skin layer (A) formulation contained 25 wt. % PBT (Toray Industries 1200M). The cast film was formed into a 120 G (30 μm) biaxially oriented film, having nominal skin (layer A) thickness 2 μm and nominal core layer thickness (layer B) 28 μm.

Example 2

Example 1 was repeated with the difference that the skin layer (A) formulation contained 25 wt. % PBT (Toray Industries 1200M) and 4 wt % IPET-based silica masterbatch (Toray Industries T89SY5)), i.e. 0.40 wt. % silica particles.

Example 3

Example 1 was repeated with the difference that the skin layer (A) formulation contained 25 wt % PBT (Toray Industries 1200M) and 4 wt % IPET based silica masterbatch (Toray Industries F55YS), i.e. 0.4 wt % silica particles. The layer (A) was increased to a nominal thickness of 3 μm and the base layer (B) was decreased to a nominal thickness of 27 μm.

Example 4

Example 3 was repeated with the difference that the skin layer (A) formulation contained 35 wt. % PBT (Toray Industries 1200M) and 4 wt % IPET-based silica masterbatch (Toray Industries F55YS), i.e., 0.4 wt. % silica particles.

Example 5

Example 3 was repeated with the difference that the skin layer (A) formulation contained 15 wt. % PBT (Toray Industries 1200M) and 4 wt % IPET-based silica masterbatch (Toray Industries F55YS), i.e., 0.4 wt. % silica particles and layer (A) had a nominal thickness of 3 μm.

The results of COF and heat-seal testing for all Examples and Comparative Examples are shown in Tables 3 and 4, respectively.

TABLE 1

Blend Composition (in wt %) of Layer A

| Example | F55M (IPET) | Resin T89SY5 (silica MB) | F55YS (silica MB) | 1200M (PBT) | W030 (Wax MB) | A Layer Nom. Thickness, μm |
|---|---|---|---|---|---|---|
| C. Ex. 1 | 100% | — | — | — | — | 2.0 |
| C. Ex. 2 | 100% | — | — | — | — | 2.0 |
| C. Ex. 3 | 100% | — | — | — | — | 3.0 |
| C. Ex. 4 | 96% | 4% | — | — | — | 2.0 |
| C. Ex. 5 | 92% | 8% | — | — | — | 2.0 |
| C. Ex. 6 | 95% | — | — | — | 5% | 2.0 |
| C. Ex. 7 | 91% | — | 4% | — | 5% | 2.0 |
| Ex. 1 | 75% | — | — | 25% | — | 2.0 |
| Ex. 2 | 71% | 4% | — | 25% | — | 2.0 |
| Ex. 3 | 71% | — | 4% | 25% | — | 3.0 |
| Ex. 4 | 61% | — | 4% | 35% | — | 3.0 |
| Ex. 5 | 81% | — | 4% | 15% | — | 3.0 |

TABLE 2

Blend Composition (in wt %) of Layer B

| Example | Resin F21MP IPET) | F18M (silica MB) | B Layer Nom. Thickness, μm |
|---|---|---|---|
| C. Ex. 1 | 95% | 5% | 28 |
| C. Ex. 2 | 95% | 5% | 28 |
| C. Ex. 3 | 95% | 5% | 27 |
| C. Ex. 4 | 95% | 5% | 28 |
| C. Ex. 5 | 95% | 5% | 28 |
| C. Ex. 6 | 95% | 5% | 28 |
| C. Ex. 7 | 95% | 5% | 28 |
| Ex. 1 | 95% | 5% | 28 |
| Ex. 2 | 95% | 5% | 28 |
| Ex. 3 | 95% | 5% | 27 |
| Ex. 4 | 95% | 5% | 27 |
| Ex. 5 | 95% | 5% | 27 |

TABLE 3

Results of Coefficient of Friction (COF) Measurements

| Example | Variation (addition to IPET in Layer A) | Layer A nom. thickness (μm) | COF (ND/D) Static ($\mu_s$) | Dynamic ($\mu_d$) |
|---|---|---|---|---|
| C. Ex. 1 | 100 wt % IPET (no additions) | 2 | 0.343 | 0.240 |
| C. Ex. 2 | 100 wt % IPET (no additions) | 2 | 0.329 | 0.297 |
| C. Ex. 3 | 100 wt % IPET (no additions) | 3 | 0.304 | 0.263 |
| C. Ex. 4 | 0.40 wt. % silica | 2 | 0.229 | 0.155 |
| C. Ex. 5 | 0.80 wt. % silica | 2 | 0.227 | 0.158 |
| C. Ex. 6 | 0.1 wt. % wax | 2 | 0.239 | 0.215 |
| C. Ex. 7 | 0.40 wt. % silica and 0.1 wt. % wax | 2 | 0.215 | 0.149 |
| Ex. 1 | 25 wt % PBT | 2 | 0.241 | 0.211 |
| Ex. 2 | 25 wt % PBT + 0.40 wt. % silica | 2 | 0.201 | 0.143 |

TABLE 3-continued

Results of Coefficient of Friction (COF) Measurements

| Example | Variation (addition to IPET in Layer A) | Layer A nom. thickness (μm) | COF (ND/D) Static ($\mu_s$) | Dynamic ($\mu_d$) |
|---|---|---|---|---|
| Ex. 3 | 25 wt % PBT + 0.40 wt % silica | 3 | 0.482 | 0.369 |
| Ex. 4 | 35 wt % PBT + 0.40 wt. % silica | 3 | 0.424 | 0.318 |
| Ex. 5 | 15 wt % PBT + 0.40 wt. % silica | 3 | 0.359 | 0.259 |

The above data indicated that the formulations with either silica or wax and with a thinner heat sealable layer (i.e., 2 μm) attained the COF target of 0.29 or less. These included Comparable Examples 4, 5, 6, 7 and Examples 1 and 2. It was also noted that a thicker sealant layer (i.e., 3 μm; Comp. Example 3 and Examples 3-5) showed higher than target COF values.

TABLE 4

Results of Heat Seal Strength Measurements on APET sheet, type Lumirror F65C - "A film"

| Example | Variation (addition to IPET in Layer A) | Layer A Nom. Thickness (μm) | Seal Strength at a Heat Seal Temperature of: | | |
|---|---|---|---|---|---|
| | | | 225° F. | 250° F. | 275° F. |
| C. Ex. 1 | 100 wt % IPET (no additions) | 2 | 131 | 848 | 579 |
| C. Ex. 2 | 100 wt % IPET (no additions) | 2 | 442 | 1583 | 1439 |
| C. Ex. 3 | 100 wt % IPET (no additions) | 3 | 406 | 2195 | 2086 |
| C. Ex. 4 | 0.40 wt. % silica | 2 | 225 | 640 | 397 |
| C. Ex. 5 | 0.80 wt. % silica | 2 | 425 | 469 | 62 |
| C. Ex. 6 | 0.1 wt. % wax | 2 | 16 | 171 | 335 |
| C. Ex. 7 | 0.40 wt. % silica and 0.1 wt. % wax | 2 | 26 | 383 | 493 |
| Ex. 1 | 25 wt % PBT | 2 | 582 | 2092 | Destruct* |
| Ex. 2 | 25 wt % PBT + 0.40 wt. % silica | 2 | 19 | 1553 | 1944 |
| Ex. 3 | 25 wt % PBT + 0.40 wt. % silica | 3 | 134 | Destruct* | Destruct* |
| Ex. 4 | 35 wt % PBT + 0.40 wt. % silica | 3 | 407 | Destruct* | Destruct* |
| Ex. 5 | 15 wt % PBT + 0.40 wt. % silica | 3 | 43 | Destruct* | Destruct* |

Destruct seals noted (i.e. exemplary test film broke prior to peel seal initiating)

The above data in Tables 3 and 4 indicated that only Examples 1 and 2 combined both COF below 0.29 and seal strength of at least 1,500 g/in at 250° F. at a nominal 2 μm sealant layer (A) thickness. Surprisingly, it was found that the use of PBT alone in Example 1 was sufficient to provide very good low COF properties to the film; and the addition of antiblock (Example 2) further lowered COF. Comparative Examples 1 and 2, which did not contain any PBT nor antiblock, showed significantly higher COF values. To lower COF comparably, addition of inorganic antiblock particles and/or waxes (Comparative Examples 4-7) needed to be used. However, this caused a degradation of heat seal strengths as shown in Table 4.

Examples 1 and 2 gave not only low COF values but also high seal strength values at both 250° F. and 275° F. Additionally, Example 1 demonstrated destructive (weld) seals at 275° F. weld (i.e., the film broke before it could peel adhesively from the APET sheet and provide a meaningful seal strength value); thus, the seal strength of Example 1 at 275° F. was in fact greater than the strength of the film itself. All the other seals were peelable (except where noted with Examples 3, 4, and 5). Although Comparative Example 2 could demonstrate comparable seal strength values, it did not result in any destruct seals—and its COF values were much higher. The remaining Comparative Examples 4-7, which had shown low COF values, had significantly inferior heat seal performance, especially the high silica content (Comp. Ex. 5) and the variations containing wax (Comp. Ex. 6 and 7).

Comparative Example 2 and Examples 3, 4, and 5 show that higher seal strength can be achieved with a thicker heat sealable layer (A) (e.g., 3 μm), but the COF is not as easily controlled. It should be noted that Examples 3-5 had a destructive (weld) seal at both 250° F. and 275° F., again indicating that the seal strength was stronger than the film itself. Even at the lowest loading of 15 wt % PBT (Example 5), destruct seals were obtained. In comparison, Comparative Example 3—with no PBT used—remained a peel seal. Increasing the sealant layer to 3 μm significantly changes the seal characteristics of the PBT-containing sealant layer, moving the mode of sealing from a peel seal to a destruct seal. This is a significantly different mode from Comparative Example 3 which shows a peel seal at a similar sealant thickness, but using only IPET (no PBT modification). Although Comparative Example 3 shows an apparently higher seal strength of 2195 g/in, in comparison to Examples 3, 4, and 5 in which an amount of PBT is included in the sealant layer (A), the seal strength of Comparative Example 3 actually is weaker than that of Examples 3-5 where Comparative Example 3 remained a peelable seal and not a welded destruct seal. Thus, surprisingly, the presence of PBT in the IPET sealant layer provides a significantly stronger seal than without PBT.

However, Example 3 showed that using a higher loading of PBT (e.g., 35 wt %) in a thicker layer of 3 μm did not offer a significant advantage in lowering COF to below 0.29 as Examples 1 and 2. Example 4 indicated that using a lower amount of PBT (e.g., 15 wt %) also did not provide the desired COF at this thicker sealant layer. Thus, it appeared that the presence of PBT in the heat seal layer (A) may not be as effective in reducing COF values in the thicker sealant regime (i.e., greater than nominal 2 μm). Thus, it appears there may be an optimum combination of PBT loading and thickness of layer (A) to provide the desired combined properties of low COF and high seal strengths.

The invention claimed is:

1. A coextruded biaxially oriented heat-sealable polyester film, comprising:
    at least one main layer (B), comprising 70-99.9 wt. % of a crystallizable polyester resin, wherein the crystallizable polyester resin in the main layer (B) comprises ethylene terephthalate repeat units, said layer having a first face and a face opposite the first face;
    at least one heat-seal layer (A) on the first face of the main layer (B), said heat-seal layer (A) comprising 60-90 wt. % of a copolyester that remains amorphous during biaxial heat orientation process and a 40-10 wt % of a crystallizable polyester resin that has a melting point 20° C. or more below that of the crystallizable polyester resin in layer (B), and wherein the crystallizable polyester resin in the heat-seal layer (A) comprises butylene terephthalate repeat units;
    wherein the heat-seal seal layer (A) has a seal temperature on APET or PETG trays or substrates of at least about 250° F. (121° C.) for seal strength of at least about 1500 W/in of film width (8.7 N/15 mm), and a static and a dynamic coefficient of friction of about 0.28 or less.

2. The film of claim 1, wherein heat-seal layer (A) further comprises 0.1-0.8 wt. % addition of antiblock particles.

3. The film of claim 2, wherein the antiblock particles are silica.

4. The film of claim 1, wherein the copolyester of the heat-seal layer (A) is a random copolyester consisting essentially of ethylene isophthalate and ethylene terephthalate repeat units at a ratio ranging between about 15:85 and 20:80 by weight.

5. The film of claim 1, further comprising at least one additional layer (C) on the opposite face of the main layer (B), wherein such additional layer (C) is selected from the group consisting of: a receiving layer for ink adhesion, a receiving layer for metal deposition, a receiving layer for ceramic deposition, and an organic barrier layer, in the form of in-line or off-line coatings.

6. The film of claim 1, wherein the heat-seal layer (A) has a nominal layer thickness of 2 μm or less.

7. The film of claim 1, wherein the heat-seal layer (A) has a nominal layer thickness of 3 μm or more.

8. The film of claim 1, wherein the heat-seal layer (A) at a heat seal temperature of 250° F. forms a non-peelable or destruct seal on APET or PETG trays or substrates.

* * * * *